Patented Feb. 24, 1953

2,629,716

UNITED STATES PATENT OFFICE 2,629,716

PREPARATION AND HYDROLYSIS OF ESTERS

Paul W. Morgan, Kenmore, N. Y., assignor to E. I. du Pont de Nemours & Company, Wilmington, Del., a corporation of Delaware No Drawing. Application July 7, 1948, Serial No. 37,492

14 Claims. (Cl. 260—226)

This invention relates to the use of trifluoroacetic acid as a catalyst in the preparation of esters from monomeric or polymeric alcohols and especially to its catalytic activity in the preparation of cellulose acetate. It relates to the catalytic activity of trifluoroacetic acid in esterifications and in hydrolyses.

In the esterification of cellulose, Zdanowich utilized what he described in U. S. 1,347,801 as nascent halogen acetic acids as catalysts and was thereby able to diminish greatly the amount of sulfuric acid normally used for that purpose. However, Barthelemy in U. S. 1,668,483 and Clarke and Malm in U. S. 1,800,860 suggest that this catalytic activity was actually due to residual halogen or other impurities in the halogenated acetic acid used by Zdanowich. Clarke and Malm state that they have carefully proven that mono, di, and trichloroacetic acids and mono, di, and tribromoacetic acids do not have any useful catalytic effect when they are pure. The anhydrides of these halogenated acetic acids have been used as impellers in the esterification of cellulose with other organic acids, i. e., they promote the formation in situ of the necessary anhydrides of the esterifying acids. For example, they convert acetic acid to acetic anhydride and the latter acts as the esterifying agent. A standard esterification catalyst is used in conjunction with the impeller.

In commercial practice, sulfuric acid is commonly used to catalyze the esterification of cellulose. The product in this case contains combined sulfur which interferes with the heat stability of the product. The sulfur must be removed by an additional hydrolysis step or by prolonged washing with hard water before the cellulose ester can be spun into useful products without degradation. Esterification and hydrolysis procedures involving improved, fast rates of reaction and avoidance of combined inorganic matter, such as combined sulfate, are needed in commercial operations, as, for example, in the preparation of cellulose esters.

It is an object of this invention to accelerate the esterification reaction of monomeric and polymeric alcohols, especially cellulosic materials. A further object is the provision of an inherently heat-stable cellulose ester thereby eliminating the stabilization step. A still further object is the provision in a single step of a cellulose acetate solution that can be wet or dry spun directly without degradation. Another object is to provide a simple process which is rapid, easily controlled and fully esterifies cellulose material at temperatures which do not substantially impair the cellulose or the cellulose esters produced therefrom. An additional object is the provision of improved catalysis in the hydrolysis of esters. Other and additional objects will be apparent hereinafter.

The objects of this invention are accomplished by catalyzing the esterification of cellulose and other alcoholic compounds with trifluoroacetic acid. The rapid esterification rate obtained is unusual and unexpected since experimentation has proved that other halogenated acetic acids and anhydrides are not catalysts for the preparation of certain esters, such as cellulose esters. Hydrolysis of esters, as, for example, primary cellulose acetate, is readily and advantageously attained using trifluoroacetic acid as the catalyst.

The following examples, wherein parts are by weight unless otherwise specified are given for illustrative purposes and are not to be construed as limitative.

EXAMPLE I

One part hydroxyethylcellulose (HEC), containing 0.3 mol hydroxyethyl (HE) groups per glucose unit, was dried directly after its preparation by solvent exchange from water to acetic acid (HOAc) until the freezing point of the acid was 15.5° C. The cellulose was centrifuged to contain 1 part acid and then added to a mixture of 5 parts acetic acid, 4 parts acetic anhydride ($Ac_2O$), and 0.3 part trifluoroacetic acid in a reaction vessel equipped for stirring and for refluxing the liquid. The mixture was heated and stirred for 90 minutes at 80°, at the end of which time a clear, fiber-free, viscous solution was obtained. A sample taken at this point was precipitated and washed with water. This product, the primary acetate, contained 2.73 acetyl groups per glucose unit (G. U.), was soluble in 93% acetone or chloroform-methanol azeotrope, and formed clear, tough stable films from solutions in these solvents. Hydrolysis was accomplished, using the trifluoroacetic acid initially present as a hydrolysis catalyst, by adding ten parts of 50% aqueous acetic acid to the reaction mixture and heating and stirring at 80° for 3 hours. At this time the solution was diluted further, precipitated in soft water, washed, and dried. The product, the secondary acetate, contained 2.39 acetyl groups per glucose unit. Clear, tough, heat-stable films were readily prepared from a solution of this product in 93% aqueous acetone. Neither the primary nor secondary acetate contained any fluorine. The trifluoroacetic acid did not combine with the polymer.

The temperature used in hydrolysis may be lowered by using a mixture of trifluoroacetic and sulfuric acids as the catalyst. A small amount (1 to 5%) of sulfuric acid can be added to the system and the temperature necessary to carry out the hydrolysis can be lowered to 50° C. or below. The sulfuric acid does not combine with the esterified cellulose to any appreciable extent. This is advantageous since the usual stabilization step is obviated with attendant economy in the process. Upon thorough washing, products of very good heat stability are obtained. The trifluoroacetic acid (B. P. 73° C.) may be recovered along with the acetic acid from the wash water or a large part may be collected by distillation from the reaction mixture at the end of the esterification or hydrolysis step. The esterification mixtures can be cast or spun directly by a wet or dry method without degradation.

EXAMPLE II

The catalytic activity of trifluoroacetic acid in esterifications is indicated in Table I below by the comparison of this acid with other halogenated acetic acids in the acetylation of hydroxyethylcellulose:

*Table I*

| Amount (Parts) | | | Temp., °C. | Time, hrs. | Catalyst (0.3 part) | Acetyls/ G. U. |
|---|---|---|---|---|---|---|
| HEC (0.3 mol HE) | HOAc | Ac$_2$O | | | | |
| 1 | 5.7 | 3.8 | 110 | 2 | None | 0.94 |
| 1 | 5.7 | 3.8 | 110 | 2 | ClCH$_2$COOH | 0.88 |
| 1 | 5.7 | 3.8 | 110 | 2 | Cl$_3$CCOOH | 1.46 |
| 1 | 5.7 | 3.8 | 80 | 1.5 | F$_3$CCOOH | 2.73 |

With the exception of temperature, the conditions of stirring, pretreatment of the cellulose sample, and the hydroxyethylcellulose sample used were identical. In the first two cases, the hydroxyethylcellulose remained fibrous and very little swollen. With trichloroacetic acid, some swelling occurred, but no solution. When trifluoroacetic acid was used, a clear, syrupy solution formed quite rapidly. With this catalyst, substantially complete esterification occurred at a lower temperature and in a time much shorter than necessary to form incompletely esterified products with the other catalysts.

EXAMPLE III

Hydroxyethylcellulose containing 0.3 mol hydroxyethyl group per glucose unit was exchanged from the water-wet state to anhydrous acetic acid as described in Example I. One part samples were acetylated for one hour at 100° C. using various amounts of trifluoroacetic acid (TFA) as the catalyst as follows:

*Table II*

| Amount (Parts) | | | Acetyls/ G. U. | Remarks |
|---|---|---|---|---|
| Total HOAc | Ac$_2$O | TFA | | |
| 5.7 | 3.8 | None | 0.26 | Fibrous. |
| 5.7 | 3.8 | 0.033 | 2.08 | Fibrous, swollen mass. |
| 5.7 | 3.8 | 0.065 | 2.56 | Nearly clear solution; some fibers. |
| 5.7 | 3.8 | 0.13 | 2.69 | Clear solution in 45 min. |
| 5.7 | 3.8 | 0.27 | 2.76 | Solution in 30 min. |

It may be seen from Table II that the speed of the reaction was proportional to the amount of trifluoroacetic acid present.

EXAMPLE IV

The hydroxyethylcellulose described in Example I was dried by exchange to propionic acid and then esterified by reaction with a total of 5 parts propionic acid, 5 parts propionic anhydride and 0.2 part trifluoroacetic acid. After the mixture was heated for forty-five minutes at 100° C., the hydroxyethylcellulose was highly swollen. The temperature was raised to 130° C. for 15 min. during which time the hydroxyethylcellulose dissolved quickly to form a clear, viscous solution. The solution was heated an additional 30 minutes at 100° C. before coagulation and washing with distilled water. Analysis of the product revealed that it contained 2.72 propionyl groups per glucose unit. The product was soluble in acetone as were the hydroxyethylcellulose acetates.

EXAMPLE V

One part of alkali activated cellulose was dried directly after its preparation by solvent exchange from water to acetic acid until the freezing point of the acid was 15.5° C. The cellulose was centrifuged to contain 1 part acid and then added to a mixture of 5 parts acetic acid, 4 parts acetic anhydride, and 0.2 part trifluoroacetic acid in a reaction vessel equipped for stirring and for refluxing the liquid. Homogeneity of the reaction mixture was attained in one hour. The mixture was heated and stirred for a total of 90 minutes at a temperature of 110° C. at the end of which time a sample was taken and precipitated and washed with water. The precipitated cellulose acetate contained 1.20 acetyl groups per glucose unit and was insoluble in acetone. At the end of three hours a second sample was withdrawn from the reaction mixture, and after precipitation and washing, the cellulose acetate contained 2.92 acetyl groups per glucose unit. This was insoluble in acetone. At this point 15 parts of 75% aqueous acetic acid was added to the acetylation mixture. The ensuing hydrolysis was allowed to proceed for three hours at 80° C. The polymer now contained 2.61 acetyl groups per glucose unit and it was soluble in acetone.

EXAMPLE VI

Pure glycerin (5 parts) was mixed with 30 parts acetic anhydride at 30° and 0.065 part trifluoroacetic acid added. The temperature rose to 40°; the reaction mixture was stirred for 15 min. after which time the liquids became miscible. The temperature continued to rise but was controlled between 45 and 50° by external cooling. After a total of 90 min. the evolution of heat subsided and the acetic acid, acetic anhydride and trifluoroacetic acid were distilled from the mixture at 110 mm. Hg pressure. A nearly quantitative yield of colorless glycerin triacetate remained.

A control mixture without the trifluoroacetic acid evolved no heat and remained immiscible for 24 hrs. Heating this mixture to 50° did not bring about miscibility. The addition of a few parts of acetic acid makes the liquids miscible but rapid esterification does not take place without a catalyst.

EXAMPLE VII

Forty-four parts of n-amyl alcohol, 30 parts of glacial acetic acid and 3.75 parts trifluoroacetic acid were heated at reflux for one hour and the mixture distilled through a distilling column. Twenty-nine parts (43% theoretical yield) of ester boiling at 145–148.5° C. was obtained. When the water was removed from the reaction mixture by azeotropic distillation with benzene added after 1 hour at reflux, 46 parts of amyl acetate was obtained (69.2% yield). In this esterification, if acetic anhydride is used in place of glacial acetic acid, the azeotropic distillation with benzene is not necessary and a nearly quantitative yield of amyl acetate is obtained.

The above examples have illustrated the application of trifluoroacetic acid in the catalyzation of the esterification of cellulose, hydroxyethylcellulose, glycerol and n-amyl alcohol with such acids or anhydrides as acetic and propionic. The invention is not limited to these alcohols and, in general, trifluoroacetic acid can be used to catalyze the esterification of any alcohol. As other polymeric alcohols which may be esterified by the process of this invention may be mentioned polyvinyl alcohols, starch and hydrolyzed olefin/vinyl acetate polymers, such as hydrolyzed ethylene/vinyl acetate polymers. Other monomers which can be used include ethanol, methanol, the propyl, butyl, amyl alcohols or the like, and the higher alcohols, such as lauryl or cetyl alcohols. Aromatic alcohols are also useful in the esterification by the method of this invention, as, for example, benzyl alcohol, phenylethyl alcohol and omega-phenylpropyl alcohol. The alcohols may contain other groups, such as ethers, esters, unsaturation and similar groups. Thus, ethylene glycol monoethyl ester, the monoethyl ether of diethylene glycol and propargyl alcohol may be used. Polyhydric alcohols other than glycerol may be esterified in accordance with this invention. For example, ethylene glycol, pentaerythritol and sucrose may be converted to esters using trifluoroacetic acid as an esterification catalyst.

Other acids may be used besides acetic and propionic or their anhydrides. In general, any acid may be used. Other aliphatic acids, such as butyric, caproic, lauric, myristic, sebacic, acrylic, crotonic, and oleic acids, among others, are useful. Aromatic acids may also be esterified using the catalytic process of this invention, as, for example, benzoic, cinnamic, phthalic and terephthalic acids. The anhydrides of these may also be used alone or in conjunction with the acids. Further, the alcohols or the acids or anhydrides may contain other substituents, such as halogen, nitro, sulfuric or similar groups. Mixed esters, such as cellulose acetate propionate and cellulose acetate butyrate, may be prepared by the process of this invention. Still further, trifluoroacetic acid may be used to promote ester interchange as a means for forming esters. For example, interchange between methyl benzoate and butanol may be accomplished using trifluoroacetic acid as the catalyst. Thus, the process of this invention may be used in the preparation of a large number of polymeric and monomeric esters.

Likewise, the trifluoroacetic acid can be used as the catalyst in the hydrolysis of any ester, monomeric or polymeric. Those esters specifically mentioned above, and those prepared from the acids and alcohols enumerated may be hydrolyzed using the catalyst of this invention. In particular, it is advantageous to use trifluoroacetic acid in the esterification and hydrolysis of cellulose esters to avoid the introduction of combined sulfate which occurs when sulfuric acid is used as the catalyst. The trifluoroacetic acid functions as an esterification or as a hydrolysis catalyst either in heterogeneous or in homogeneous systems.

The catalyst of this invention is not limited to free trifluoroacetic acid as the starting material. Any material giving trifluoroacetic acid under the conditions of hydrolysis or esterification can be used. Thus, readily hydrolyzed esters of trifluoroacetic acid or salts of the acid which liberate the acid under the conditions of esterification or hydrolysis. The sodium salt is an example. In its use a small amount of sulfuric acid or similar acid is usually added to liberate the trifluoroacetic acid. Use of the sodium salt or similar salts is advantageous in that such salts are easier to handle than trifluoroacetic acid. In addition to trifluoroacetic anhydride, mixed anhydrides, such as acetic-trifluoroacetic anhydride or trifluoroacetic-benzoic anhydride may be used in the processes of this invention. Usually the anhydride acts as an impeller and trifluoroacetic acid is formed in the reaction mixture.

This invention is not limited to the manner of pretreatment nor to the type of cellulose used. Cotton linters, wood pulp, regenerated cellulose and the partially substituted cellulose derivatives such as methylcellulose, ethylcellulose, hydroxyethylcellulose and the like may be employed. With the cellulose derivatives, pretreatment is not so important since substitution leads to solubility. In general, the higher the substitution the more soluble is the derivative in organic solvents and the faster is the esterification.

Since this invention pertains to a catalytic process, any amount of the catalyst, trifluoroacetic acid, will catalyze the reaction. In practice amounts of catalyst are usually above 0.5% based on the alcohol. Of course, for a particular alcohol the amount may be lower or higher than this, depending upon the nature of the alcohol, the temperature to be used, and similar factors. For cellulose, the amount of pretreatment and the degree of substitution are factors. The amount can be 5%, or if soluble starting products are employed, lower amounts can be used. Highly esterified products cannot be produced if air-dry cellulose is used, even at high temperature. Generally, in the esterification of cellulose, the cellulose is submitted to a swelling action, such as the usual alkali activation of cellulose. Any of the well-known activation methods may be used. These include the use of organic and inorganic acids and their neutral, acidic or basic salts. The method disclosed in the copending application of Thomas Serial No. 16,621 filed March 23, 1948, now Patent No. 2,585,516, issued February 12, 1952, is particularly useful. In this method cellulose is impregnated with a mixture of an amide, such as urea, or a salt of a carboxylic acid with ammonia or an amine having at least one amino hydrogen, such as ammonium acetate and a compound of an inorganic oxygen acid of sulfur, such as sulfuric acid, its partial esters or amides, sulfurous acid, the thiosulfuric acid, tetrathionic acid, persulfuric acid or a salt of any of these with ammonia or an amine having at least one amino hydrogen. There is no upper limit on the amount of trifluoroacetic acid. In fact, in certain instances the acid may be used in sufficiently large quantities to act as the solvent medium. For practical purposes, in the interest of economy, usually no more than 30% amounts based on the cellulose is used. Since the acid is a catalyst, the speed of the reaction is proportional to the amount of catalyst present.

The temperatures employed may be varied over a large range, as, for example, from room temperature to 250° C. At the higher temperatures the esterifications are usually accomplished in closed systems. For cellulose and its derivatives at 80-150° C. from 5% to 30% of trifluoroacetic acid can be used satisfactorily. The larger amounts, such as 30% or more, are preferred if the temperature is kept low, as, for example, 50° C. In general, with increasing solubility due to extensive substitution lower amounts of catalyst can be used. The preferred operating conditions for esterification of cellulose involve a temperature of 80-150° C. and 15-30% of trifluoroacetic acid based on the cellulose. At temperatures appreciably lower than 80° C., as 50° C., the esterification of cellulose does not proceed very rapidly nor extensively. However, other materials, as, for example, the soluble cellulosic materials and, as shown in Example VI, glycerol can be effectively esterified at low temperatures, such as room temperature to 50° C. For reactive alcohols the temperature can be as low as 25° C. or lower. One skilled in the art will adjust the temperature to the particular acids and alcohols employed.

Trifluoroacetic acid is a genuine catalyst and not an impeller in the esterification of cellulose. An impeller in the esterification of cellulose has been defined by Clarke and Malm as a material which promotes the formation of the anhydride of the acid being used to modify the cellulose. Trifluoroacetic acid will not react with another organic acid to form the anhydride of the latter organic acid and, therefore, cannot be classed as an impeller. Generally, it is preferred, though not essential, to have an anhydride present in the reaction mixture in order to obtain a substantial amount of esterification. Trifluoroacetic anhydride reacts vigorously with other organic acids to produce the new acid anhydride and trifluoroacetic acid. Therefore, one can prepare cellulose acetate as well as other esters by using a mixture of trifluoroacetic anhydride, acetic acid or other acid and an activated cellulose. In this case the trifluoroacetic anhydride acts as an impeller as described by Clarke and Malm while the trifluoroacetic acid formed in this reaction acts as the catalyst for the esterification of the cellulose. This process differs from that previously described by Clarke and Malm in that no additional catalyst need be added to the system to obtain full esterification of the cellulose. As can be seen from these considerations, trifluoroacetic anhydride may be used for any part or all of the trifluoroacetic acid in the esterification of cellulose. As illustrated above, other catalysts can be used, if desired along with trifluoracetic acid but normally the trifluoroacetic acid only is used.

The trifluoroacetic acid catalyst may be readily recovered by distillation or extraction followed by distillation. For example, a reaction mixture, as in the last example of the table under Example III, was distilled after 40 min. at 100° C. and a distillate boiling at 70-118° C. was collected. A titration of this distillate indicated that it contained all of the catalyst. The distillate was then used in place of the trifluoroacetic acid and part of the acetic acid in another esterification, which proceeded nearly as well as the first. This procedure of recovery is satisfactory if one wishes to prepare only primary cellulose esters. The trifluoroacetic acid may be recovered in this way and sulfuric acid or other catalysts may be used for the hydrolysis step. The most satisfactory recovery method for trifluoroacetic acid is to extract it with a solvent, for example, ether, along with the acetic acid from the precipitation liquors. To illustrate, if 100 cc. of 1.5% aqueous solution of trifluoroacetic acid is extracted with five 25 cc. portions of ether, 92% of the trifluoroacetic acid can be recovered. After boiling off the ether, the trifluoroacetic acid can be fractionally distilled or reused as a concentrate.

The outstanding advantages of the use of trifluoroacetic acid as a catalyst in the esterification and in the hydrolysis of cellulose or its derivatives is the heat stability of the products. Unlike sulfuric acid catalysis, there is no combination of trifluoroacetic acid with the cellulosic material. No stabilization steps are required such as hydrolysis or prolonged washing. The product may be precipitated in hard or soft water and may be dried before all traces of acid have been removed without discoloration or degradation. For example, the primary esters prepared in the table in Example III were precipitated in distilled water, washed and dried at 100° C. after removal of most of the water at 80° C. After 24 hours at 100° C. no discoloration odor of acetic acid, or loss of solution viscosity was noticed. Such esters prepared by standard methods with sulfuric acid char and decompose in a few hours unless subjected to some additional stabilization treatment. Films of these esters prepared with trifluoroacetic acid catalysts by the process of this invention can be also heated at 200° C. for 2 hours without discoloration or embrittlement. The esterification mixtures can be cast or spun directly by a dry or wet system without degradation. However, in such a procedure further esterification or hydrolysis may occur. The trifluoroacetic acid catalyst may be recovered along with the acetic acid from the wash water or a large part may be collected by distillation from the reaction mixture at the end of the esterification or hydrolysis step. While it is, of course, possible to esterify the various alcohols disclosed herein with trifluoroacetic acid to form trifluoroacetates, if desired, this invention is concerned chiefly with the use of trifluoroacetic acid as a catalyst and combination of the acid catalyst with the alcohols is avoided in the processes of this invention.

An impeller such as chloroacetic anhydride may be used in conjunction with the trifluoroacetic acid catalyst when one is preparing the cellulose ester of an acid whose anhydride is difficult to obtain. As it was previously pointed out, it is unnecessary to use a separate catalyst and an impeller in this event because trifluoroacetic anhydride can be used and will satisfy both requirements. Prior to this invention, it was found necessary to use a separate catalyst along with an impeller in these difficult circumstances.

Any departure from the above description which conforms to the present invention is intended to be included within the scope of the claims.

I claim:

1. In esterifications for the production of organic esters from acids and alcohols the step which comprises carrying out said esterifications in the presence of trifluoroacetic acid as a catalyst.

2. In esterifications for the production of polymeric organic esters from acids and alcohols the step which comprises carrying out said esterifications in the presence of trifluoroacetic acid as a catalyst.

3. A process in accordance with claim 2 in which the said polymeric esters are cellulose esters.

4. A process in accordance with claim 2 in which said polymeric esters are cellulose acetates.

5. In esterifications for the production of monomeric organic esters from acids and alcohols the step which comprises carrying out said esterifications in the presence of trifluoroacetic acid as a catalyst.

6. In esterifications for the production of organic esters from acids and alcohols the step which comprises carrying out said esterifications at a temperature of from 25 to 250° C. and in the presence of at least 0.5% of trifluoroacetic acid as a catalyst.

7. A process in accordance with claim 6 in which the said esters are cellulose esters and the temperature is from 80° C. to 150° C. and the amount of trifluoroacetic acid is from 5% to 30%.

8. In the hydrolysis of organic esters to acid and alcohol constituents thereof the step which comprises carrying out said hydrolysis in the presence of trifluoroacetic acid as a catalyst.

9. A process in accordance with claim 8 wherein said esters are cellulose esters.

10. A process in accordance with claim 8 wherein said esters are cellulose acetates.

11. A process in accordance with claim 2 in which the said esters are hydroxyethyl cellulose acetates.

12. A process for the production of hydroxyethyl cellulose acetate which comprises reacting hydroxyethyl cellulose with an acidic compound in the presence of at least 0.5% of a catalyst comprising trifluoroacetic acid at a temperature of from about 80° C. to about 150° C.

13. In esterifications for the production of polymeric organic esters from acids and alcohols the step which comprises carrying out said esterifications in the presence of a catalyst comprising trifluoroacetic acid.

14. In the hydroylsis of primary cellulose acetates to secondary cellulose acetates the step which comprises carrying out the hydrolysis in the presence of trifluoroacetic acid as a catalyst.

PAUL W. MORGAN.

REFERENCES CITED

The following references are of record in the file of this patent:

UNITED STATES PATENTS

| Number | Name | Date |
|---|---|---|
| 1,347,801 | Zdanowich | July 27, 1920 |
| 1,800,860 | Clarke et al. | Apr. 14, 1931 |
| 2,053,527 | Malm et al. | Sept. 8, 1936 |
| 2,083,667 | Reid | June 15, 1937 |
| 2,136,030 | Stone | Nov. 8, 1938 |
| 2,436,144 | Howk | Feb. 17, 1948 |

OTHER REFERENCES

Groggins: "Unit Processes in Organic Synthesis," 1947, pages 624 to 626.